United States Patent [19]

Kelling

[11] 4,001,558
[45] Jan. 4, 1977

[54] AVERAGE PHASE POSITION CIRCUIT

[75] Inventor: Leroy U. C. Kelling, Waynesboro, Va.

[73] Assignee: General Electric Company, New York, N.Y.

[22] Filed: Sept. 11, 1975

[21] Appl. No.: 612,293

[52] U.S. Cl. .......................... 235/151.11; 318/632; 318/608; 318/603; 235/92 CC; 235/92 MP

[51] Int. Cl.[2] ........................................ G05D 3/04

[58] Field of Search .......... 318/608, 606, 632, 683; 235/151.11

[56] References Cited
UNITED STATES PATENTS 3,668,501   6/1972   Chitayat ............................ 318/632

Primary Examiner—Eugene G. Botz
Attorney, Agent, or Firm—Stephen A. Young; Walter C. Bernkopf; Robert A. Cahill

[57] ABSTRACT

Method and apparatus for phase averaging of two phase position signals to derive a single phase position signal. The apparatus comprises phase discriminators for comparing each of the two phase position signals to the phase of the single phase position signal and a combining circuit for summing the output signals from the phase discriminators to derive an error signal when the single phase position signal is not midway between the phases of the two phase position signals. Circuitry is provided to modify the phase of the single phase position signal in response to the amplitude of the error signal.

6 Claims, 2 Drawing Figures

C1

C2

$\overline{C2}$

B1

B4

AVERAGE PHASE POSITION CIRCUIT

BACKGROUND OF THE INVENTION

The present invention is directed to a numerical control machine tool system and, more particularly, to apparatus for averaging of two position feedback signals representing position of a single axis of motion.

In numerical control machine tool systems a position transducer is generally associated with each axis of motion of the machine. The transducer provides a feedback signal to a numerical control from which signal the numerical control derives information indicating the position and velocity of the machine tool with respect to a work piece. This information is then utilized by the numerical control in generating position and velocity commands to be applied to motors controlling movement of the machine. Such a numerical control system is shown in U.S. Pat. No. 3,173,001—Evans, assigned to the assignee of the present invention. In Evans the feedback signal is provided by X and Y axes position feedback synchro resolvers. The feedback signal from each resolver is applied to a corresponding pulse shaper circuit which converts the sine wave output from the resolver into a square wave while maintaining the proper zero cross overpoint of the sine wave such that phase information is retained. The squared feedback signal from the pulse shaper circuit is then applied to a digital phase discriminator which includes a reversible counter. The phase discriminator compares the phase of the feedback signal to the phase of the commanded position signal and produces a digital output error signal proportional to the phase difference. This digital output error signal is converted to an analog signal which is applied by means of a servo amplifier to drive the machine to the respective axis.

In some machines the construction and operation are such that it becomes impossible to locate a single position transducer in a manner to detect position and motion of the machine tool along a particular axis. Such a situation might occur, for example, in a large milling machine in which the bed of the machine is moved along the vertical axis by means of gears located at opposite ends of the bed. Because of the inability to make perfectly matched gears it is obvious that in this type of milling machine movement of one end of the bed will not correspond exactly with movement of the opposite end of the bed and that movement of the work piece with respect to the machine tool will not correspond exactly with either end of the bed.

SUMMARY OF THE INVENTION

The present invention provides a means for obtaining position and velocity feedback signals representing actual movement of the machine tool in those instances in which it is impossible to position a single transducer to detect motion along a particular axis. In this invention two transducers are located equidistant from but on opposite sides of an axis of motion. The feedback signals derived from each of the transducers are combined and averaged to produce a resultant feedback signal having a phase displacement midway between the respective phase displacement of each of the transducer feedback signals. The resultant feedback signal is generated by an output counter whose count rate can be varied by introducing extra counts or by deleting counts. The resultant feedback signal is controlled by comparing its phase to the phase of each of the transducer feedback signals in respective digital phase discriminators. The output signals from the discriminators are then summed in an adder. If the resultant feedback signal is phased properly the output of the adder will be zero and no correction will be necessary. If the adder output is non-zero, the non-zero count is transferred into an up down counter which is used as a storage register. At proper intervals, as determined by gating logic circuits, the count in the storage register is used to add or delete a corresponding number of counts from the output counter to thereby adjust the phase of the resultant feedback signals.

It is therefore an object of the present invention to provide a means to accurately determine position and velocity of a machine tool in a numerical control system.

It is a further object of the invention to provide a means for determining position and velocity along a particular axis of a machine tool in those cases where at it is impossible to position a single transducer to effect such position and velocity.

It is a still further object of the invention to provide a means for combining the output signals of two transducers to produce a resultant output signal having a phase displacement midway between the phase displacements of each of the transducer output signals.

DESCRIPTION OF THE DRAWINGS

The foregoing and other objects of the present invention will become apparent as the following description proceeds and features of novelty which characterize the invention will be pointed out in particularity in the claims affixed to and forming a part of the specification. For a better understanding of this invention reference is made to the accompanying drawings in which:

DETAILED DESCRIPTION

Figure 1:
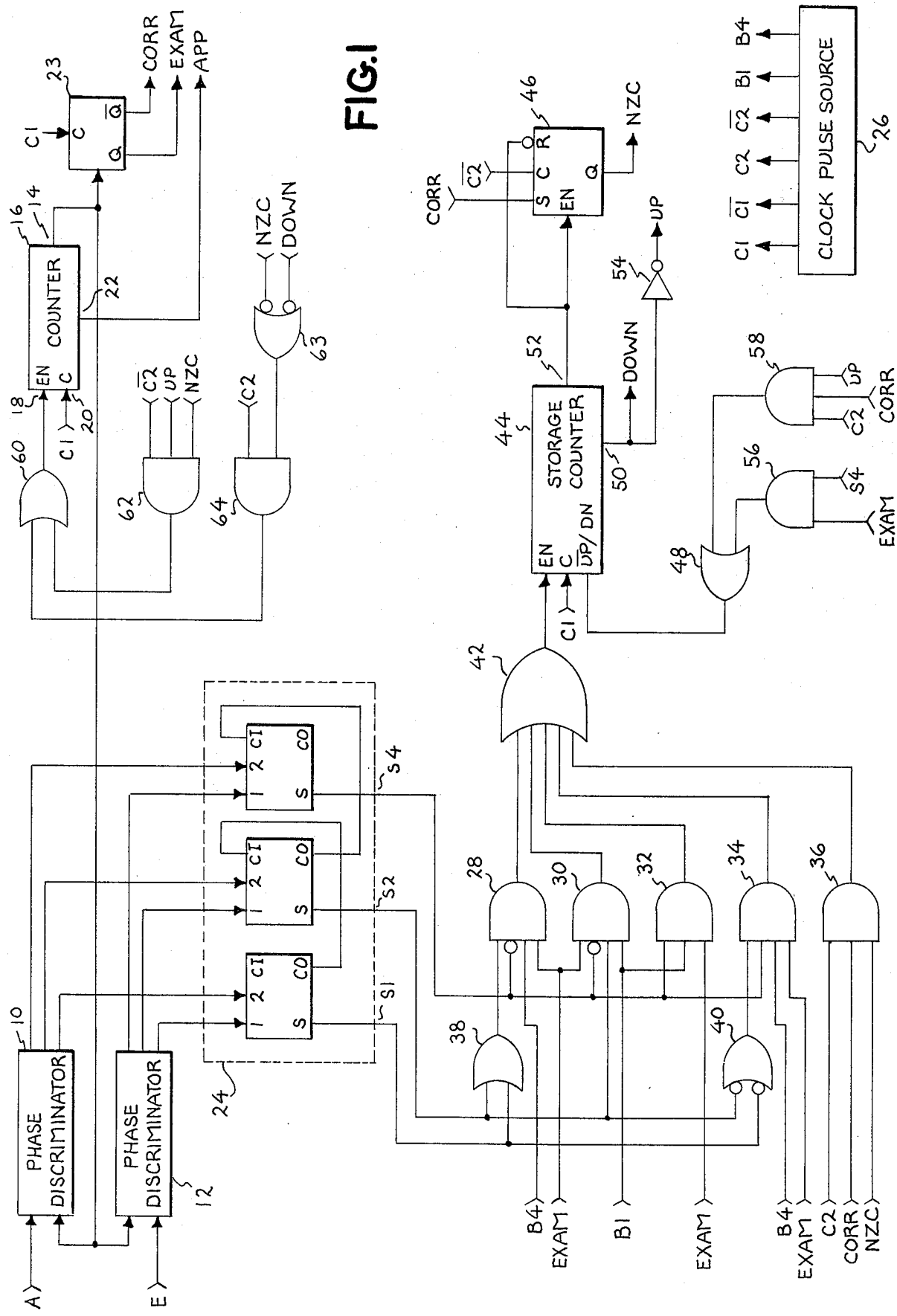
FIG. 1 illustrates schematically a preferred embodiment of the invention.

Referring to FIG. 1 there is shown a block diagram of a circuit according to the present invention. A pair of digital phase discriminators 10 and 12 of the type described in the aforementioned Evans patent have first input terminals connected to receive feedback position signals A and E from respective transducers (not shown), it being understood that the feedback position signals are derived from transducers located on opposite sides of and equidistant from an axis of motion of a machine. A second input terminal of each phase discriminator 10 and 12 is connected to receive a reference feedback signal from an output terminal 14 of a decimal output counter 16. Phase discriminators 10 and 12 generate parallel binary output signals from an internal reversible counter. As is well known the reversible counter indicates a negative count by a logic 1 in the register corresponding to the most significant digit. Accordingly, the counter is limited to a count less than its maximum capability in order that the most significant digit may be used as a sign bit.

Counter 16 is a cyclical counter of a type well known in the art which includes an enable terminal 18 and a clock terminal 20. Clock pulses applied to terminal 20 will be counted by the counter so long as an enable signal is available at terminal 18. Counter 16 includes two output terminals 14 and 22. For the purpose of ease of illustration, the counters and logic gates described herein will be described with reference to a particular counting capability; however it is to be understood that counting capability is merely a design choice dependent on desired system response. In a preferred embodiment counter 16 is a divide-by-one thousand counter and terminal 22 is connected internally to the final stage of counter 16 to thereby produce a logic 1 output signal when the counter reaches a count of 800. Terminal 14 is connected internally to selected stages of counter 16 to thereby produce a logic 1 output signal when the counter attains a count of 999, this output signal being hereinafter referred to as a 999 signal. Output signals on both terminal 22 and terminal 14 revert to a logic 0 state when the counter resets on the one thousandth clock pulse. The output signal developed at terminal 22 is a resultant output signal which is utilized to determine the actual position of the machine tool, i.e., the resultant output signal represents the average phase position signal (APP) and may be processed by the numerical control system to control the machine tool. In the particular embodiment shown, the trailing edge of the resultant output signal is used to control position.

The operational cycle of the present invention is divided into two alternating cycles — an examination cycle and a correction cycle. These alternate cycles are established by means of a flip-flop 23 of a type well known in the art which flip-flop has an input terminal connected to terminal 14 of counter 16. A clock terminal is connected to receive C1 clock pulses from a clock pulse source 26. Flip-flop 23 has two output terminals Q and $\overline{Q}$ which provide respectively an examination (EXAM) output signal and a correction (CORR) output signal. A logic 1 signal on either the Q or $\overline{Q}$ output terminals identifies the particular mode or cycle of operation. As is apparent, upon receipt of a 999 signal and a C1 clock pulse flip-flop 23 will change state and cause the operation of the circuit to switch to a different cycle.

The binary output signals from phase discriminators 10 and 12 representing the phase differences between the corresponding input signals are applied to an adder circuit 24 of a type well known in the art. As will become apparent, the illustrated embodiment is capable of responding to total phase errors equivalent to no more than plus or minus three revolutions of a transducer shaft with respect to the resultant output signal. This error is equivalent to a total displacement of 1080° of the phase of the resultant output signal. Larger transient phase differentials can be accommodated by enlarging the number of stages in the digital counter circuitry within phase discriminators 10 and 12 and by adding additional stages to adder circuit 24. Adder circuit 24 sums the output signals from phase discriminators 10 and 12 to provide a digital sum signal representative of the difference between the phase of transducer signal A with respect to the 999 signal and the phase of transducer signal E with respect to the 999 signal. If the 999 signal is positioned midway of the phases of the transducers A and E signals, the output of adder circuit 24 will be a digital zero. Adder circuit 24 outputs, starting with the least significant digit, are labeled S1, S2 and S4.

Figure 2:
FIG. 2 illustrates selected timing waveforms.
Figure 2:
Figure 2:
Figure 2:
Figure 2:

Before continuing with a description of the circuitry of FIG. 1, reference is now made to the timing diagrams of FIG. 2. The first timing sequence, identified as C1, represents the primary clock pulses generated by clock pulse source 26. The secondary clock pulses are identified as C2 and are at one-half the frequency of C1. $\overline{C2}$ clock pulses are merely the inverted C2 clock pulses. Clock pulses B1 and B4 occur at one-quarter of the frequency of the C1 clock pulses, but each occurs at different time positions.

Referring again to FIG. 1, the output terminals S1, S2 and S4 of adder circuit 24 are connected to a gating logic circuit comprising a plurality of AND gates 28, 30, 32, 34 and 36 and a plurality of OR gates 38, 40, and 42. The gating logic is responsive to the adder circuit 24 output signals and to appropriate timing signals to convert the parallel binary output signals from adder circuit 24 into a serial pulse train for application to a storage counter 44. As can be seen the S4 output is connected to each of the AND gates 28, 30, 32 and 34. The S4 output is used as a sign output to determine whether to advance or delay the phase of the 999 signal. Similarly the Q output terminal of flip-flop 23 is connected to input terminals of each AND gate 28, 30, 32 and 34, as indicated by the EXAM input signal to each AND gate, to thereby control the cycle during which storage counter 44 is updated. The application of the B1 and B4 timing signals to effect the parallel binary to serial pulse train conversion will be explained in detail in the discussion of operation of the invention infra.

AND gate 36 has an output terminal connected to an input terminal of OR gate 42 to thereby enable storage counter 44 during the correction cycle. The output terminals of AND gates 28, 30, 32 and 34 are likewise connected to input terminals of OR gate 42 and thus to the enable terminal of counter 44 to thereby enable counter 44 during the examination cycle. AND gate 36 has three input terminals connected respectively to the C2 output terminal of clock source 26, to the $\overline{Q}$ output terminal of flip-flop 23 and to the Q output terminal of a flip-flop 46, the latter flip-flop providing a NON-ZERO-CORRECTION (NZC) signal indicating that a correction to the phase position of the 999 signal is required.

In order to transfer an update signal into counter 44, an enable signal must be applied from OR gate 42 to the enable terminal of counter 44 and a clock pulse signal, C1, must be applied to the clock input terminal of counter 44. The count direction for counter 44 is controlled by an OR gate 48 which has an output terminal connected to the UP/DOWN input terminal of counter 44. Counter 44 is a reversible counter of a type well known in the art including a first outut terminal 50 connected to a final stage of counter 44 and a second output terminal 52 connected internally of counter 44 to a plurality of stages of the counter. A logic 1 signal at terminal 52 indicates a non-zero count in counter 44. The signal developed at terminal 50 is identified as a DOWN signal and when the DOWN signal is inverted by an inverter 54, an UP signal is produced at the output terminal of inverter 54.

Output terminal 52 of counter 44 is connected to an enable terminal (EN) and to a reset terminal (R) of flip-flop 46. A set terminal(s) of flip-flop 46 is connected to the Q terminal of flip-flop 23. A clock terminal (C) of flip-flop 46 is connected to a $\overline{C2}$ terminal of clock source 26. Flip-flop 46 is responsive to an enable signal from counter 44 and to a CORR signal in conjunction with a $\overline{C2}$ clock pulse to produce an NZC signal at the Q output terminal for a time period of one C2 clock pulse. The NZC signal from flip-flop 46 is utilized to affect a correction of counter 16 by enabling counter 44 during the correction cycle to thereby allow counts to be added to or deleted from counter 16.

Update of counter 44 is controlled by gating logic circuitry comprising OR gate 48, AND gate 56 and AND gate 58. AND gate 56 is a two input AND gate having a first input terminal connected to the Q or EXAM output terminal of flip-flop 23 and a second input terminal connected to the S4 output terminal of adder circuit 24. AND gate 58 is a three input AND gate having a first terminal connected to the C2 output terminal of clock source 26, a second input terminal connected to the $\overline{Q}$ or CORR output terminal of flip-flop 23 and a third input terminal connected to the output terminal of inverter 54 wherein the UP control signal is produced. The output terminals of each AND gate 56 and 58 are connected to corresponding input terminals of OR gate 48, the output terminal of OR gate 48 being connected to the $\overline{\text{UP/DOWN}}$ input terminal of counter 44. Since counter 44 requires a logic 0 on the $\overline{\text{UP/DOWN}}$ input terminal, it is obvious that the output signals from AND gates 56 and 58 must both be at logic 0 levels for counter 44 to count up. For AND gate 56 to produce a logic 0 output signal would require either that the circuit be in a correction cycle, which would result in the EXAM signal being a logic 0, or alternatively that the S4 input be a logic 0 which would occur if the adder circuit 24 output were a positive number. For AND gate 58 to produce a logic 0 output signal would require that the circuit be in an examination cycle which would result in the CORR signal being a logic 0 or alternatively that the UP signal from inverter 54 be a logic 0 which would occur if a negative number were present in counter 44. During the correction cycle a C2 clock pulse is also applied through AND gate 58 to synchronize the transfer of counts from counter 44 to counter 16.

In order to update counter 16 there is provided gating logic circuitry comprising an OR gate 60, an AND gate 62, an AND gate 64 and an OR gate 63. AND gate 62 is a three input AND gate which functions to force additional clock pulses into counter 16 to thereby advance the phase of the 999 signal. Similarly AND gate 64 in conjunction with OR gate 63 is a three input logic circuit which functions to delete clock pulses from counter 16 to thereby retard the phase of the 999 signal.

AND gate 62 has a first input terminal connected to receive a $\overline{\text{C2}}$ clock pulse from clock source 26, a second input terminal connected to receive an UP signal from inverter 54 and a third input terminal connected to receive an NZC signal from flip-flop 46. The output terminal of AND gate 62 is connected to a first input terminal of OR gate 60 and the output terminal of OR gate 60 is connected to the enable terminal of counter 16.

AND gate 64 has a first input terminal connected to receive a C2 clock pulse from clock source 26, a second input terminal connected to an output terminal of OR gate 63. OR gate 63 has a first input terminal connected to receive an inverted NZC signal from flip-flop 46 and a second input terminal connected to receive an inverted DOWN signal from terminal 50 of counter 44. The output terminal of AND gate 64 is connected to a second input terminal of OR gate 60.

In the operation of the invention as described above, consider the situation in which the 999 signal is occurring at a time relationship which is closer to the phase of the A transducer input signal than to the phase of the E transducer input signal. In this situation a correction is required to advance the phase of the 999 signal so that it occurs midway between the phases of the A and E transducer signals. For this situation the output signals from the phase discriminators 10 and 12 when combined in the adder circuit 24 will result in a net positive binary output signal. This positive binary signal can then be used to add additional counts into counter 16 to advance the phase of the 999 signal. In this instance the S4 output of adder circuit 24, which is utilized as a sign bit, will be logic 0 since the net result is a positive binary number and either the S1 or the S2 or both output terminals of adder circuit 24 will be a logic 1. For this example, consider the error signal is plus 1 count so that the S1 output terminal is a logic 1 signal and the S2 and S4 terminals are at a logic 0 level. The output signal from the S4 terminal will enable gates 28 and 30 since it will be inverted by the NOT gates on the input terminals prior to being applied to the AND gates. On the otherhand, AND gates 32 and 34 will be disabled by the logic 0 applied to their respective input terminals. The S2 signal which is also a logic 0 will disable AND gate 30 since it is also applied as an input signal to that gate; therefore, the only AND gate which will be enabled for the present example will be AND gate 28 which has been previously identified as the plus one AND gate. During the next examination cycle a logic 1 signal will be applied as indicated by the EXAM input signal to gate 28 thus allowing a count to be transferred into storage counter 44. Upon receipt of the B4 clock pulse gate 28 will output a logic 1 signal which will be applied through OR gate 42 to the enable terminal of storage counter 44. This enable signal will then allow the C1 clock pulses applied to the storage counter to inject a series of pulses into the counter. Since the circuit is in the examination cycle the EXAM input terminal of AND gate 56 will be a logic 1; however, the S4 input terminal of AND gate 56 will be a logic 0 and therefore the output terminal of AND gate 56 will be a logic 0. Thus a logic 0 will be applied to the up-down input terminal of counter 44 thereby forcing the counter to count in the upward direction. Because the B4 clock pulses applied to AND gate 28 are occurring at only ¼ the frequency of the C1 clock pulses the count introduced into storage counter 44 will represent only ½ of the total error which was detected by adder circuit 24. At the end of the examination period the $\overline{Q}$ output of flip-flop 23 will revert to a logic 0 and the Q output will go to a logic 1 thereby providing a correction signal indicating that the circuit is now in the correction mode. Reversion of the EXAM signal to a logic 0 will terminate update of counter 44.

In the correction mode of operation the correction signal from flip flop 23 is applied to AND gate 58. Gate 58 also monitors the UP signal derived from the last stage of counter 44. In the present example the counter counted in the upward direction so that the last stage of the counter will be at a logic 0 thereby providing a logic 0 at terminal 50 which when inverted by inverter 54 will provide a logic 1 UP signal. Had the error detected by adder 24 been in the negative direction then the count injected into counter 44 would have caused the counter to count downward from 0 in such a manner that the last stage of the register would be at a logic 1, i.e., a minus 1 count in counter 44 is indicated by a logic 1 in each stage of the counter. Continuing with the present example, since the UP signal is a logic 1 and the correction signal is a logic 1, upon receipt of a C2 clock signal the output of AND gate 58 will go to a logic 1 and a logic 1 will be applied to the up-down input terminal of storage counter 44 through OR gate 48. This signal will cause the storage counter to begin to count down towards 0. During this same cycle of operation the correction signal applied to the SET input terminal of flip-flop 46 and the logic 1 signal from terminal 52 of counter 44 applied to the enable terminal flip flop 46 will cause the Q output of flip flop 46 to produce a logic 1 signal upon receipt of a $\overline{C2}$ clock pulse. The signal at terminal 52 of counter 44 is obviously a logic 1 since the example contemplated has introduced a count into the storage counter. The NZC signal and the UP signal from inverter 54 are applied to the input terminals of an AND gate 62 and when the $\overline{C2}$ signal is a logic 1, AND gate 62 is enabled and provides an output signal to the enable terminal of counter 16 during $\overline{C2}$ time. This allows an extra C1 clock pulse to be counted into the counter during $\overline{C2}$ time. During this same cycle the DOWN signal from the last stage of counter 44 is a logic 0 and is applied through inverting OR gate 63 to an input terminal of AND gate 64 thereby enabling AND gate 64 during the C2 clock time. Thus the enable terminal of counter 16 remains enabled for both the C2 clock time and the $\overline{C2}$ clock time thus allowing an extra count to be inserted into the counter. In this manner additional counts are accumulated in counter 16 to cause the phase of the 999 signal to be advanced. During this continuous update of counter 16 the NZC signal and correction signal applied to AND gate 36 cause the enable terminal of storage counter 44 to be high therefore allowing counts to be counted out of the storage counter. In this manner the storage counter 44 has subtracted from its contents a single count for each count of the counter 16.

Had the error detected by adder circuit 24 been in the negative direction such that it was necessary to retard the phase of the 999 signal it would then be necessary to delete counts from counter 16. In order to delete counts from counter 16 it is first necessary to store a negative number in counter 44. This is accomplished through the use of the S4 or sign output of adder circuit 24. When the adder circuit counts a negative number the S4 output will be a logic 1. This will cause AND gates 32 and 34 to be enabled and will result in the enabling of storage counter 44. At the same time the AND gate 56 will be enabled by the S4 sign bit and will present a logic 1 signal to the up-down input terminal for counter 44. This logic 1 signal on the up-down input terminal will cause storage counter 44 to count in a negative direction which will result in a logic 1 signal being placed in the last stage of counter 44. With the last stage of counter 44 at a logic 1, the output of inverter 54 will be a logic 0 and will disable AND gate 62 during the C2 time. At the same time the NZC signal and the DOWN signal are logic 1's and when inverted by OR gate 63 result in a logic 0 being presented to AND gate 64. This will disable AND gate 64 during the next C2 clock period thus preventing counter 16 from being enabled and forcing a deletion of one of the C1 counts which would appear during that particular C2 clock time. The logic 0 up signal also applied to AND gate 58 will result in the output of OR gate 48 being a logic 0 and will cause storage counter 44 to count in the up direction towards 0. In this manner counts are deleted from counter 16 and at the same time counter 44 is counted upward for every deleted count to thereby complete the update loop in such a manner that the phase of the 999 signal is retarded an amount equal to the count stored in the counter 44.

While the principles of the invention have been made clear in an illustrative embodiment, there will appear to those skilled in the art may modifications in structure, arrangement, proportions and components used in the practice of the invention which are particularly adapted for specific environments and operating requirements, without departing from those principles. The appended claims are therefore intended to cover and embrace any such modifications within the limits only of the true spirit and scope of the invention.

I claim:

1. In a numerical control machine tool system including two position transducers for a single axis of motion, and wherein the phase of a feedback signal from a transducer is indicative of tool position, apparatus for phase averaging position feedback signals derived from each transducer to produce a resultant position signal, said apparatus comprising:
   a source of clock pulses;
   counter means responsive to said clock pulses for producing the resultant position signal and a reference signal at clocked intervals;
   a first phase discriminator having a first input terminal connected to receive a first position feedback signal from one of the position transducers and having a second input terminal connected to receive said reference signal, said first phase discriminator producing a first signal proportional to the phase difference between the first position feedback signal and said reference signal;
   a second phase discriminator having a first input terminal connected to receive a second position feedback signal from the other of the position transducers and having a second input terminal connected to receive said reference signal, said second phase discriminator producing a second signal proportional to the phase difference between the second position feedback signal and said reference signal;
   summing means connected to receive said first and second signals and responsive thereto to produce a third signal proportional to the difference therebetween;
   error storage means;
   gating means for periodically transferring said third signal to said error storage means;
   control means connected between said error storage means and said counter means, said control means being responsive to said third signal stored in said error storage means to periodically adjust the clocked interval of said counter means to thereby control the phase relationship between said reference signal and the first and second position feedback signals by application of a gating signal to said counter means.

2. The invention as defined in claim 1 wherein said first and second phase discriminators comprise digital phase discriminators producing parallel binary output signals with at least one of said signals from each of said discriminators being indicative of the polarity of said phase difference.

3. The invention as defined in claim 2 wherein said error storage means comprises a reversible counter and said control means comprises gating logic circuitry responsive to the presence of a digital count in said reversible counter to periodically modify clock signals applied to said counter means.

4. The invention as defined in claim 3 wherein said counter means comprises a recycling decimal counter including an enable terminal and a clock terminal, said counter means being responsive to said gating signal applied to said enable terminal to count clock pulses applied to said clock terminal, said counter means producing said reference signal at a predetermined count and terminating said reference signal upon recycling of said counter means to a zero state upon attainment of a second predetermined count.

5. The invention as defined in claim 4 and including bistable means connected to receive said reference signal and responsive to alternate ones of said reference signals to provide a first logic signal and responsive to other alternate ones of said reference signals to provide a second logic signal, said bistable means being connected to apply said first and second logic signals to said gating means and to said control means whereby two cycles of operation of said apparatus are provided, said first cycle being effective to transfer said error signal into said error storage means and said second cycle being effective to transfer said error signal from said error storage means to said counter means.

6. A method for deriving an average phase position signal in a numerical control machine tool system of the type including two position transducers for a single axis of motion, each transducer producing a phased feedback position signal, said method comprising the steps of:
generating an average phase position signal at clocked intervals;
comparing the phase position of said average phase position signal to the phase of each of said feedback position signals;
generating an error signal when the phase position of said average phase position signal is not midway of the phase of each of said feedback position signals;
storing said error signal for a first cycle of operation;
utilizing said error signal during a second cycle of operation to modify said clocked intervals.

* * * * *